United States Patent [19]

Palmer

[11] 4,236,784

[45] Dec. 2, 1980

[54] DISCRETELY POSITIONED MAGNETIC FIBER OPTIC SCANNER

[75] Inventor: John P. Palmer, Pomona, Calif.

[73] Assignee: General Dynamics Corporation Pomona Division, Pomona, Calif.

[21] Appl. No.: 27,551

[22] Filed: Apr. 6, 1979

[51] Int. Cl.³ .................................................. G02B 5/14
[52] U.S. Cl. ............................... 350/96.20; 350/96.29
[58] Field of Search ................. 350/96.15, 96.20, 96.29

[56] References Cited

U.S. PATENT DOCUMENTS

| | | | |
|---|---|---|---|
| 2,926,286 | 2/1960 | Skellett | 340/166 R |
| 3,461,454 | 8/1969 | Steckenrider | 340/166 R |
| 3,470,320 | 9/1969 | Pike et al. | 350/96.29 |
| 3,541,442 | 11/1970 | Gaston | 358/139 |
| 3,609,658 | 9/1971 | Soltan | 340/166 R |
| 3,941,927 | 3/1976 | Russell | 350/96.29 |

FOREIGN PATENT DOCUMENTS 1189755  3/1965  Fed. Rep. of Germany ........ 350/96.29

OTHER PUBLICATIONS

Hale et al., "Mechanical Optical-Fibre Switch", *Electronics Letters*, vol. 12, No. 15 (1976), p. 388.

*Primary Examiner*—Davis L. Willis
*Assistant Examiner*—Janice A. Howell
*Attorney, Agent, or Firm*—Neil F. Martin; Edward B. Johnson

[57] ABSTRACT

Disclosed is a magnetic fiber optic scanner which includes a flexible optical fiber of predetermined length, having one end fixedly supported in a cantilevered fashion, and having an opposite end that is unsupported and free to move. A magnet is rigidly mounted on the fiber near the unsupported end to there produce a magnetic dipole moment parallel to the length of the fiber. A grid like array of electrical conductors lies in a plane that is perpendicular to the fiber and is spaced apart from the unsupported end. By passing current through selected ones of the conductors, localized magnetic fields are produced that react with the dipole moment to position the unsupported end of the optical fiber in offset alignment with the selected conductors.

13 Claims, 11 Drawing Figures

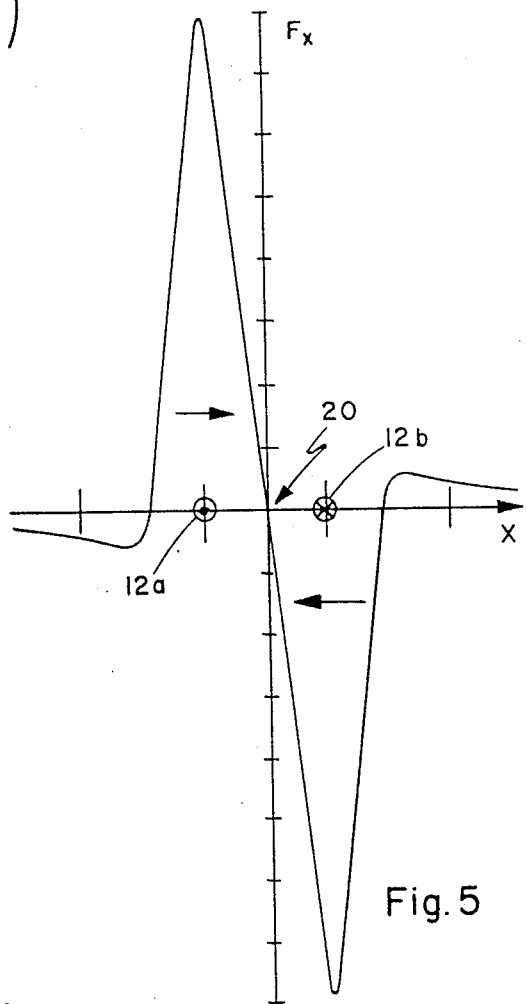

EQ. 1    $\vec{F} = \nabla(\vec{m} \cdot \vec{B})$

EQ. 2    $\vec{F} = \nabla(m_z B_z)$

EQ. 3    $\vec{F} = m_z \left( \dfrac{\partial B_z}{\partial x} \hat{x} + \dfrac{\partial B_z}{\partial z} \hat{z} \right)$ EQ. 4    $F_x = m_z \left( \dfrac{\partial B_z}{\partial x} \right)$ EQ. 5    $B_z = |\vec{B}| \cos \theta$ EQ. 6    $B_z = \dfrac{2I}{CR} \cos \theta$ EQ. 7    $B_z = \dfrac{2I}{C} \left( \dfrac{x}{x^2 + z^2} \right)$ EQ. 8    $F_x = \dfrac{2Im_z}{C} \left( \dfrac{z^2 - x^2}{x^2 + z^2} \right)$

Fig. 3

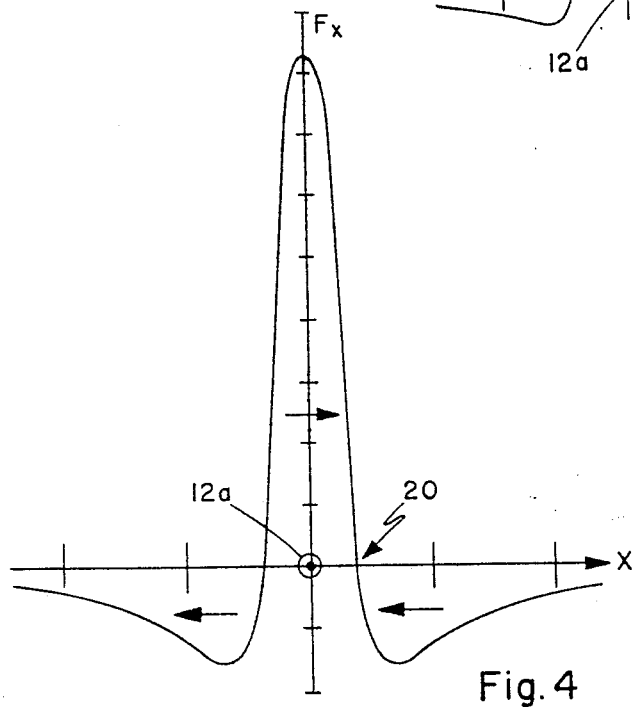

Fig. 4

DISCRETELY POSITIONED MAGNETIC FIBER OPTIC SCANNER

BACKGROUND OF THE INVENTION

This invention relates to fiber optics, and more particularly to fiber optic devices that perform image scanning or image displaying. Such devices in the past have included a single optical fiber which is supported rigidly at one end. That is, the other end is unsupported as in a cantilevered structure. The unsupported end of the fiber is thus free to move over a curved surface which approximates a plane if the displacement of the movable end of the fiber is small compared to the length of the fiber.

Such a structure has been utilized both as a display device and as an image scanning device. If the supported end of the fiber is coupled optically to a light emitting diode, then light is transmitted from the diode to the free end of the fiber. This light generates an image on the plane over which it moves when the modulating electrical signal for the light emitting diode is correlated with the scanning motion of the fiber. Conversely, the supported end of the fiber can be optically coupled to a photo diode. In that case, an image that is projected by some other apparatus onto a plane that the free end scans, is transmitted to the photo diode and converted to a time dependent electrical signal.

In the prior art, such optical scanning devices all used continuous motion scanning. Typically, a raster pattern was used. The continuous motion was achieved either electro-statically or electro-magnetically. Continuous electro-static motion was achieved, for example, by placing a charge on the fiber, and by placing the charged fiber between the plates of a parallel plate capacitor. Similarly, continuous electro-magnetic motion was achieved by placing a magnetic material on the fiber, and by placing the magnetized fiber between a pair of Helmholtz coils or other similar coil arrangement.

All of these prior art devices, however, are deficient in that they do not provide any means for positioning the moveable end of the fiber in discrete increments. That is, they only enable the movable end to be moved in a continuous scanning motion, such as a raster. If however, the movable end could be moved in discrete increments, it could be positioned much more accurately. Further, the scanning pattern of the movable end could be adopted to best suit the task at hand. For example, if information from only a portion of the entire scanning area were desired, the scanning pattern could be readily modified to cover only that portion. As another example, if a target were being tracked, the scanning pattern could simply lock onto the movement of the target.

Therefore, it is a primary object of the invention to provide an improved magnetic fiber optic device that can scan scenes in discrete increments.

BRIEF SUMMARY OF THE INVENTION

These and other objects are accomplished in accordance with the invention by a magnetic fiber optic scanner that includes a flexible optical fiber that is rigidly supported on only one end in a cantilevered fashion. The opposite end is free to move. A magnet, such as a permanent magnetic or electro magnetic, is rigidly mounted on the fiber near the movable end. This produces a magnetic dipole moment parallel to the length of the fiber. A grid like array of electrical conductors lie in a plane that is perpendicular to the fiber and is spaced apart from the movable end. These conductors preferably are disposed on a thin transparent substrate such as glass. The conductors themselves may be comprised of either a transparent material such as tin oxide, or a non-transparent metal such as aluminum. Also preferably, the conductors include a first set running in one direction and a second set lying perpendicular to the first direction. In operation, the movable end of the fiber may be positioned in offset alignment with any two intersecting conductors by simply passing current through those two conductors. Alternatively, the movable end may be even more securely positioned by passing current in opposite directions through an adjacent pair of wires in the first set and another adjacent pair of wires in a second set.

DESCRIPTION OF THE DRAWINGS

Various preferred embodiments of the invention will best be understood by reference to the following detailed description, when read in conjunction with the accompanying drawings wherein:

FIG. 3 includes a set of equations describing the forces created by the vectors in FIG. 2.

FIG. 4 is a plot of the force in the X direction that is exerted on the fiber of FIG. 1 when current is passed through a single conductor.

FIG. 5 is a plot of the force in the X direction that is exerted on the fiber of FIG. 1 when current is passed through a pair of adjacent conductors in opposite directions.

DETAILED DESCRIPTION

Figure 1:
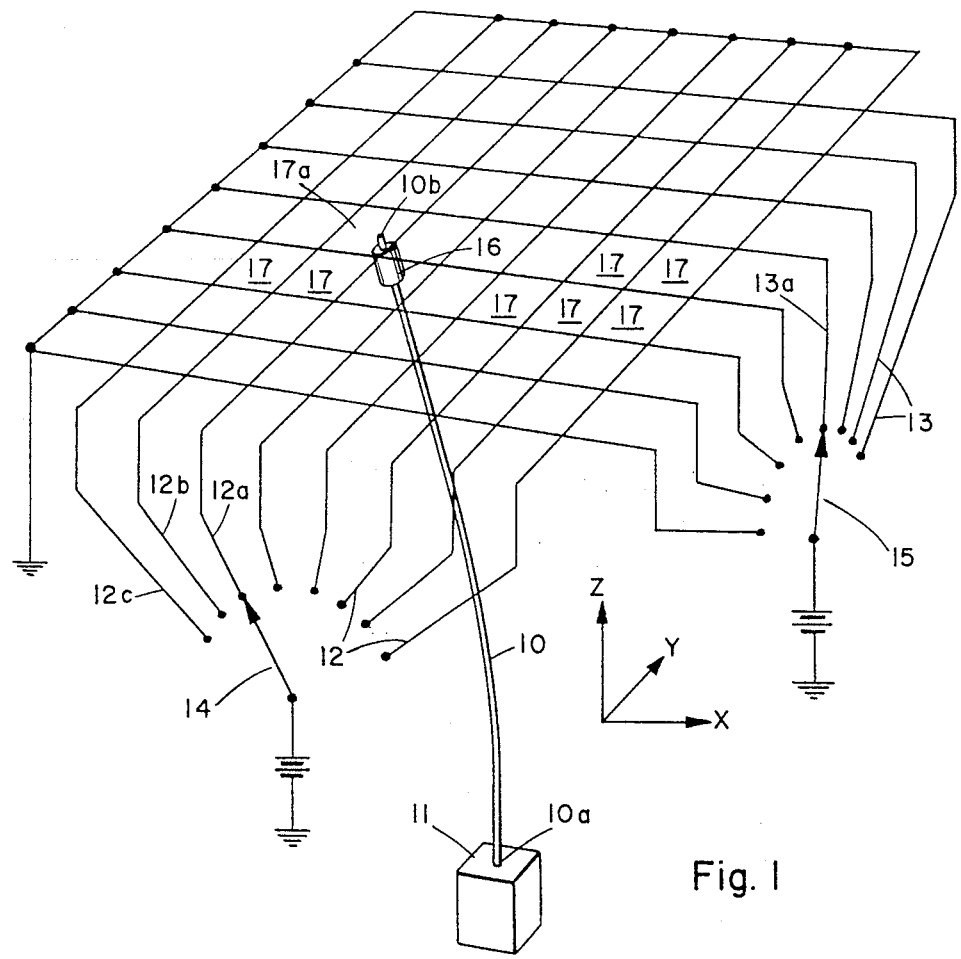
FIG. 1 is a pictorial schematic diagram of a magnetic fiber optic scanner constructed according to the invention.

Referring now to FIG. 1, there is illustrated a schematic diagram of a fiber optic scanner constructed according to the invention. This embodiment includes a flexible optical fiber 10 having one fixed end 10a and one movable end 10b. The fixed end is optically coupled to either a light emitting diode or a photo diode. These are indicated via reference numeral 11. If the fixed end is optically coupled to a light emitting diode, then the light generated by the diode in response to an electrical signal is transmitted via the fiber 10 to the movable end 10b. Conversely, if the fixed end 10a is optically coupled to a photo diode, then light projected onto the movable end 10b is transmitted to the photo diode and converted into an electrical signal. These arrangements are useful in display devices and image scanners as discussed in the background portion of this disclosure. As used herein the term "magnetic fiber optic scanner" shall include both display devices and image scanners.

Also included in the FIG. 1 embodiment, is a grid like array of electrical conductors. They are divided into two sets as indicated via reference numerals 12 and 13. These conductors lie in a plane perpendicular to fiber 10 that is spaced apart from the movable end 10b. Suitably, the conductors 12 and 13 lie perpendicular to each other as illustrated.

The FIG. 1 embodiment also includes means for generating current 14 and 15 through selectable ones of the conductors 12 and 13. The current generating means is indicated schematically in FIG. 1 as being comprised of a mechanical switch having a common terminal connected to a voltage source. This however, is only a functional representation. There are of course many solid state current switching arrangements that may be used to implement the indicated functions.

The FIG. 1 embodiment further includes the magnetic means 16 that is rigidly mounted on the fiber 10 near the movable end 10b. This magnetic means produces a magnetic dipole moment parallel to the length of fiber 10. In one preferred embodiment, the magnetic means 16 is comprised of a discrete permanent magnet. Alternatively, the magnetic means 16 may be comprised of a thin film of magnetic material coated on fiber 10. Also alternatively, the magnetic means 16 may be comprised of an electro-magnet having input leads which run along the length of fiber 10 towards the fixed end 10a for connection to a suitable current source. Additional details on the construction of a suitable magnetic means 16 are given in conjunction with FIG. 8.

By appropriately generating currents through selected ones of the conductors 12 and 13, the movable end 10b may be positioned to lie within any one of the areas 17 that are defined by the intersection of the conductors. In FIG. 1, end 10b is illustrated as being aligned under area 17 as an example. This position is reached in response to the generation of current through conductors 12a and 13a as indicated by the switch position. The principals on which this operation are based is described below.

Figure 2:
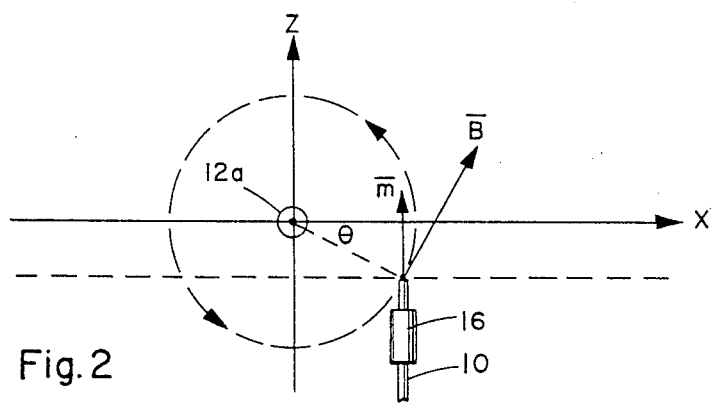
FIG. 2 is a vector diagram illustrating the operation of the device of FIG. 1.

FIG. 2 contains an end view of conductor 12a. There, the current is depicted as coming out of the page. As a result, the magnetic field intensity $\bar{B}$ has a counter clockwise direction. Also illustrated in this figure is the magnetic dipole moment $\bar{m}$ that is produced by the magnetic means 16. Due to the interaction between the magnetic dipole moment and the magnetic field intensity B, a force is exerted on the movable end of fiber 10.

A mathematical expression for this force is given by equation 1 of FIG. 3. Equation 1 may be simplified by recognizing that the magnetic dipole moment in FIG. 2 has only a 1 direction component. Utilizing this fact, equation 1 can be rewritten as equation 2. Now, equation 2 may be simplified by utilizing the fact that the B field does not vary in the Y direction. That is, the partial derivative of B with respect to Y is zero. Based on this, equation 2 may be rewritten as equation 3.

Equation 3 states that there are forces on the optical fiber 10 in both the X direction and the Z direction. However, since one end of fiber 10 is fixed, the fiber itself is not free to move in the Z direction. Utilizing this fact, equation 3 may be rewritten as equation 4.

Now what remains to be done is to form a mathematical expression for the Z component of the B field, and to take its partial derivative with respect to X. An expression for the Z component of the B field is given in a general form as equation 5. This expression is rewritten in equations 6 and 7 in terms of the parameters I, C, X, and Y. In these expressions, I represent the current through conductor 12a, R is the distance from conductor 12a to the movable tip 10b, and C is the speed of light. By taking the partial derivative of equation 7 with respect to X, and substituting the result into equation 4, the desired expression is obtained. This result is given as equation 8.

Referring now to FIG. 4, equation 8 is plotted for one value of Z and with X being the running variable. This plot shows how the force on tip 10b varies in both magnitude and direction as a function of the coordinate X. For example, when tip 10b is aligned directly under conductor 12a, the magnetic field exerts a force on the tip which tends to move it in a plus X direction. Conversely, as tip 10b is moved to lie under one of the other conductors, a magnetic force is exerted on the tip in the minus X direction. As a result, tip 10b will come to rest at a point that is in offset alignment with conductor 12a. This point is indicated in FIG. 4 via reference numeral 20.

Note that in FIG. 4, the magnitude of the forces that are exerted on tip 10b in the plus X direction are generally substantially larger than the forces that are exerted on tip 10b in the opposite direction. In some applications, such as those subject to vibration, it may be desirable to equalize the magnetude of the balancing forces on tip 10b. This may readily be achieved by generating currents of equal but opposite directions through a pair of adjacent conductors.

A plot of the force in the X direction that is produced on tip 10b by such an arrangement is given in FIG. 5. There, tip 10b will come to rest at a point indicated via reference numeral 20. This point lies halfway between the two current carrying conductors. This point is highly stable in that it is balanced by forces of equal magnitude and opposite direction on either side thereof.

The development to this point has shown how tip B may be positioned in the X direction. Clearly, however, it can be said that by symmetry, a selective generation of currents through the conductors 13 may be utilized to position tip 10b in the Y direction. And by superposition, the simultaneous selective generation of currents through conductors 12 and 13 results in the positioning of tip 10b within a single selectable one of the areas 17.

Figure 6:
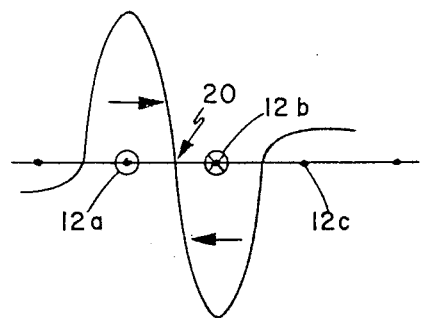
FIGS. 6A-6D are a set of curves illustrating a sequence for generating current in the conductors of FIG. 1 to move the movable end by one discrete increment.
Figure 6:
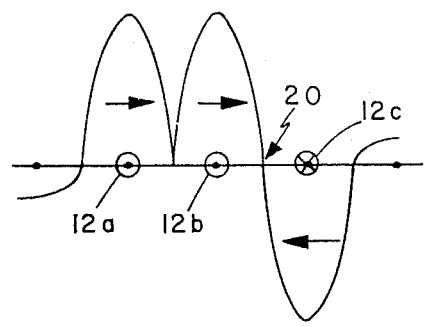
Figure 6:
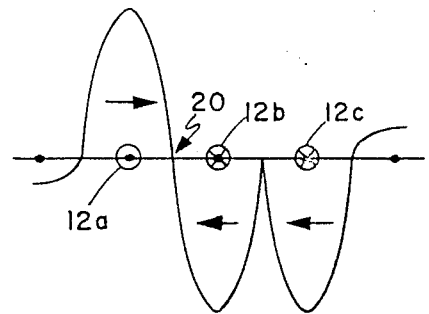
Figure 6:
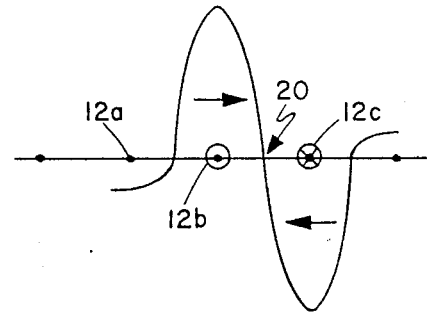

Reference should now be made to FIGS. 6A through 6D. These figures illustrate a preferred sequence for applying current to the conductors 12 and 13 in order to move tip 10b from one of the areas 17 to an adjacent one. In these curves, reference numeral 20 again indicates the stable point with which tip 10b will be aligned. The starting point of the sequence is illustrated in FIG. 6A. There, the stable point is between conductors 12a and 12b. Current comes out of the page in conductor 12a; and it goes into the page in conductor 12b.

In the sequence illustrated, tip 10b is moved to a stable position between conductors 12b and 12c. To that end, a current is first generated in conductor 12c of the same magnitude and in the same direction as the current in conductor 12b. This is illustrated in FIG. 6B. Next, the current in conductor 12b is reversed in direction. This is illustrated in FIG. 6C. As a result, a force is exerted on tip 10b as illustrated which moves the tip to the right.

When the tip gets more than midway between conductors 12b and 12c, a force is applied thereto which attemps to move it to the left. This force is exerted in response to the current that flows through conductor 12c. Due to the balance of forces that are generated by the current in conductors 12b and 12c, the tip 10b stops at position 20. Then, the current flow in conductor 12a can cease, as is illustrated in FIG. 6D.

To move tip 10b in the opposite direction, the sequence of FIGS. 6A through 6D need only be reversed. That is, starting with the conditions illustrated in FIG. 6D, a current would first be generated in conductor 12a having the same magnitude and direction as the current in conductor 12b. Then the current in conductor 12b would be reversed. And then, the current flow in conductor 12c would be terminated.

Figure 7:
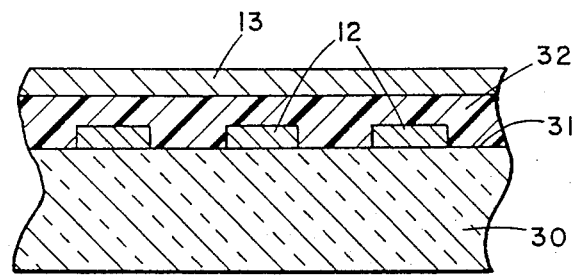
FIG. 7 is a greatly enlarged cross-sectional view of the conductors of FIG. 1.

Referring now to FIG. 7, one preferred embodiment for the array of conductors 12 and 13 will be described. These conductors are formed on a thin transparent substrate 30, such as glass or quartz for example. Conductors 12 are disposed on one surface 31 of this substrate. Suitably, these conductors are formed by known photolithography and etching techniques. The conductors 12 may also be transparent. Suitable materials include tin-oxide, lead-tin-oxide, or titanium-dioxide. Alternatively the conductors 12 may consist of a non-transparent metal, such as gold or aluminum for example.

An insulating layer 32 lies on surface 31 and also overlies the electrodes 12. The insulating layer may be of silicon dioxide for example. Suitably, this layer is formed by a chemical reaction of $SiH_4$ in oxygen. Lying on the insulating layer 32 is the set of conductors 13. These conductors are formed by the same techniques and the same materials as are the conductors 12. Utilizing presently available photolithography and etching techniques, the conductors 12 and 13 may readily be formed to have a width dimension of 0.010 inches, and an edge-to-edge spacing of 0.010 inches. These dimensions can of course be modified to meet ones's particular needs.

Figure 8:
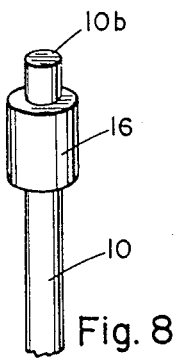
FIG. 8 is a greatly enlarged pictorial view of the movable end of the fiber of FIG. 1 with a magnet attached thereto.

Referring now to FIG. 8, one preferred method of attaching the magnetic means 16 to fiber 10 will be described. Suitable, fiber 10 is a galite 5000 c fiber as produced by Gallileo Electro-Optics Corporation. The magnetic means 16 may be attached thereto as follows. First a powder of magnetic material, such as iron or $S_mC_{05}$, is suspended in pine-oil (cermalloy, type HHS 382). Sufficient powder should be added to produce a thick paste. The paste is then pressed into a cylindrical tube of an appropriate diameter, such as 0.020 inches. Then one end of the glass fiber 10 is inserted through the paste.

The paste and the fiber are then ejected from the tube, by using a push rod for example. Then the oil is evaporated, and the iron powder is sintered by passing the fiber through a conveyer type dryer oven. A post sintering heat treatment produces a hard magnetic material 16 which adheres strongly to the fiber 10. The magnetic material 16 is then permanently magnetized in the direction of the fiber axis.

Various preferred embodiments of the invention have now been described in detail. In addition, many modifications and changes may be made thereto without departing from the nature and spirit of the invention. Therefore, it is to be understood that the invention is not limited to said details, but is defined by the appended claims.

Having described my invention, I now claim:

1. A magnetic fiber optic scanner comprising:
a flexible optical fiber having one end fixedly supported and an opposite end that is unsupported and free to move;
means mounted on said fiber near said unsupported end for there producing a first magnetic field;
an array of electrical conductors extending substantially perpendicular to said fiber adjacent to said unsupported end; and
means for generating current through selectable ones of said conductors to produce localized second magnetic fields that interact with the first magnetic field and cause the unsupported end of said optical fiber to move in discrete increments.

2. A magnetic fiber optic scanner according to claim 1, wherein said means for producing said first magnetic field is a discrete permanent magnet.

3. A magnetic fiber optic scanner according to claim 1, wherein said means for producing said first magnetic field is a thin film of magnetic material coated onto said fiber.

4. A magnet fiber optic scanner according to claim 1, wherein said means for producing said first magnetic field is an electromagnet.

5. A magnetic fiber optic scanner according to claim 1, wherein said array of electrical conductors is comprised of a transparent substrate and a plurality of thin film conductors etched on said substrate.

6. A magnetic fiber optic scanner according to claim 5, wherein said conductors are transparent.

7. A magnetic fiber optic scanner according to claim 5, wherein said conductors are made of a non-transparent metal.

8. A method of positioning the movable end of a flexible optical fiber having an opposite end which is fixedly supported, said method comprising the steps of:
mounting a magnetic means on said fiber near the movable end thereof for producing a first magnetic field;
placing an array of electrical conductors adjacent to said movable end, said conductors extending substantially perpendicular to said fiber; and
coupling of all of said conductors to a means for generating current through selectable ones thereof to produce localized second magnetic fields that interact with the first magnetic field and cause the moveable end of said optical fiber to move in discrete increments.

9. A magnetic fiber optic scanner comprising:
a flexible optical fiber having one end fixedly supported and an opposite end that is unsupported and free to move;
magnetic means rigidly mounted on said fiber near said unsupported end for there producing a magnetic dipole moment parallel to the length of said fiber;
a grid like array of electrical conductors lying in a plane perpendicular to said fiber adjacent to said unsupported end; and
means for generating current through selectable ones of said conductors to produce localized magnetic fields that interact with said dipole moment to position the unsupported end of said optical fiber in offset alignment with the selected conductors.

10. A method of positioning the movable end of a flexible optical fiber having an opposite end which is fixedly supported, comprising the steps of:
rigidly mounting a magnetic means on said fiber near the movable end thereof to produce a magnetic dipole moment parallel to the length of said fiber;
placing a first set of spaced apart electrical conductors in a plane lying perpendicular to said fiber and spaced apart from said movable end, and placing a second set of spaced apart electrical conductors transverse to said first set; and coupling of all of said conductors to a means for generating current through selectable ones thereof to produce localized magnetic fields that react with said dipole moment to position the movable end of said optical fiber in offset alignment with the selected conductors.

11. A method according to claim 10, wherein said means for generating current is operable for generating current in a single selectable conductor of said first set, and simultaneously generating a current in a single selectable conductor of said second set to position said movable end in offset alignment with the intersection of said selected conductors.

12. A method according to claim 10, wherein said means for generating current is operable for generating current in opposite directions in one selectable pair of adjacent conductors in said first set, and simultaneously generating a current in opposite directions in another selectable pair of adjacent conductors in said second set to position said movable end in the region defined by the intersection of said selected conductor pairs.

13. A method according to claim 11, wherein said means for generating current is operable for generating current in opposite directions in first and second adjacent selectable conductors in one of said sets; then simultaneously generating current in a third conductor in said one set lying adjacent to said second conductor, the direction of the current in said third conductor being the same as the direction of the current in said second conductor; and then reversing the direction of current in said second conductor; and then stopping the generation of current in said first conductor.

* * * * *